S. D. HARTOG.
PISTON FOR HYDROCARBON ENGINES.
APPLICATION FILED FEB. 12, 1921.
1,430,010.                                    Patented Sept. 26, 1922.
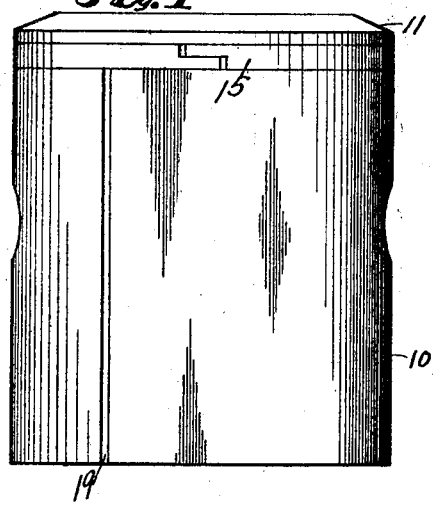
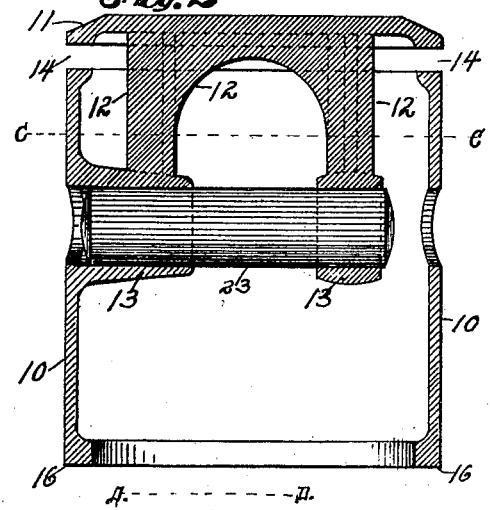
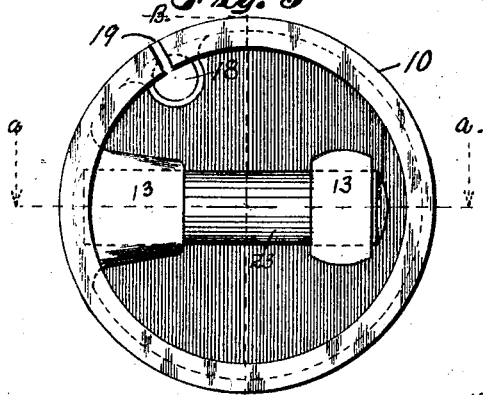
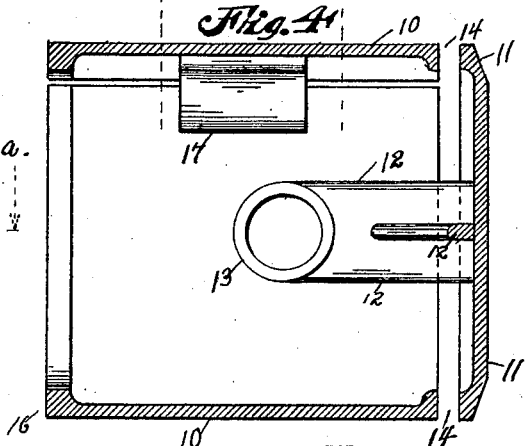
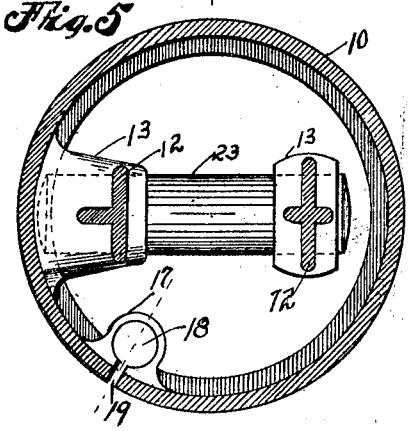
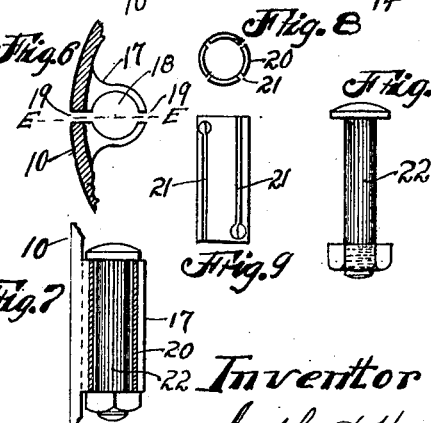
Inventor
Stephen D. Hartog

Patented Sept. 26, 1922.

1,430,010

UNITED STATES PATENT OFFICE.

STEPHEN D. HARTOG, OF ST. LOUIS, MISSOURI.

PISTON FOR HYDROCARBON ENGINES.

Application filed February 12, 1921. Serial No. 444,342.

*To all whom it may concern:*

Be it known that I, STEPHEN D. HARTOG, a citizen of the United States, residing at St. Louis, State of Missouri, have invented new and useful Improvements in Pistons for Hydrocarbon Engines, of which the following is a specification.

This invention relates to pistons, more particularly to an expansion type of pistons for use in hydro-carbon engines.

In the prior art, expansion pistons are of various constructions among such are those having two or more parts, the expansion of which being accomplished by means of circular split springs which actuate semi-circular bodies. Those also of the split body type wherein the body of the piston is provided with a series of slits cut through and lengthwise of the body. Also those having arcuate peripheral slits cut through the body adjacent the lowermost packing ring groove and transverse the vertical axis, the slits extending only part way around the circumference of the body. All of which are objectionable and unsatisfactory for the reason of having too many working parts, resulting in excessive wear and tear, high labor and material cost and expensive maintenance. A plurality of body slits occasions the passage of oil into the combustion chambers, causing excess carbon and irregular ignition, unequal pressure against the cylinder wall due to the non-yielding portion contiguous with the head and body of the piston.

The present invention overcomes all of the objections to which reference has been made by a simple, economical, and efficient one-piece construction characterized by the feature of having a circumferentially yielding expansible body portion uniformly expansible and contractable over its entire circumferential area.

The object therefore, of the present invention is to construct a piston in such a novel way whereby it is enabled to expand and contract circumferentially uniform and yielding to an accurate tensional fit to the bore of the cylinder in which it is operable under any and all of the varying heat temperatures to which it may be subjected and to so function irrespective of its metallic composition whether it be cast iron, aluminum or composition alloy.

To such ends the invention comprises, a piston having its head and body held together as a unit by the novel manner in which the piston pin supporting means is constructed, and arranged within the body of the piston whereby the body of the piston can be cut to provide the piston body the piston 11 the head 12 supporting ribs expand and contract uniformly and accurately over its entire circumferential area, and further means provided whereby the capacity to expand and contract can be enhanced to any extent required.

For the purpose of enabling others to understand, make and use this invention the following description is given supplemented by the accompanying drawing, in which:

Figure 1, is a side elevation.

Figure 2, is an elevation in section along the line *a—a* Figure 3.

Figure 3, is an end view into the body.

Figure 4, is a sectional view line *b—b* Figure 3.

Figure 5, is a plan view line *c—c* Figure 2.

Figure 6, is a fragmentary plan view line *d—d* Figure 4.

Figure 7, is a fragmentary elevation line *e—e* Figure 6.

Figure 8, is a plan view of member part.

Figure 9, is an elevation of member part Figure 8.

Figure 10 is an elevation of a member part.

In the drawing like reference numerals indicate like parts throughout the several views, 10 designating the body portion of the piston 11 the head 12 supporting ribs having integral intersection with the interior surface of the head 11, one portion of the rib 12 supports at its extremity a piston pin boss 13 the position of which is such that it is independent of and away from the body 10, the other portion of the rib 12 has integral intersection with the piston pin supporting boss 13 which is also integrally connected to the body 10. The purpose of this construction is to connect the head 11 with the body 10 at one side only, so that one of the bosses 13 will be free and away from any connections with the body 10, while the other boss is integrally connected to the body 10. The body 10 being connected at one side only by means of the piston pin supporting bosses 13, the head 11 by ribs 12 is such that the body 10 can be separated from the head 11 by a cut or opening 14, the opening 14, is constructed and adapted to receive a piston packing ring 15. The body 10 to be cut through and lengthwise thereof from the bottom 16 into the opening 14 by a slit or cut 19. Cutting the body in this manner at 14 and 19 yet holding the entire structure together as a unit by the integrally connected boss 13 with the body 10, the ribs 12 with the head 11, provides the body 10 with the capacity to expand and contract circumferentially true over its entire area by reason of the fact that it has but one position at which there is a connection with the body 10 for the piston pin supporting bosses 13, and the head 11. Cutting the body 10 at 14 and 19 provides the body 10 with a maximum area which is yieldingly and resiliently free to expand and contract uniformly, circularly and accurately and more effectively than if it were connected at diametrically opposite positions by either the piston pin bosses or ribs.

At a predetermined position within the body 10 and midway its length 14—16 and approximately near the boss 13, which is connected to the body 10, a lug or projection 17 is formed integral with the body 10. In the lug 17 the hole 18 is drilled therethrough and central thereof leaving a uniform thickness of metal supporting the lug so that slit 19 can be cut through and lengthwise the body 11 and into hole 18 separating the annular body 10, though still held together by the undisturbed contiguity of the metal which remains connected with the lug 17 and the body 10. The result being such that a yoke is formed of a yielding resilient character in conformity with the structure of the body 10.

This construction is most advantageously designed, in that it embodies all of the features necessary to the making of a highly efficient and economical piston for the hydrocarbon engine, namely, it is possessed of all the strength of a solid type piston structure, the body being immunized from the direct transmission of heat from the head to the body preventing undue expansion and distortion thereof, the entire body is yielding, expansible and contractable, not sectional or portional but uniformly circular, extending around its peripheral area, resulting from the manner in which the construction can be cut, that is to say, the least number of cuts provided the condition of maximum effectiveness.

While the foregoing description has reference to cast iron pistons I wish it understood that my construction is not limited to that character of metal only, but comprehends the aluminum or composition alloy pistons in the same capacity as cast iron. When aluminum or composition alloy pistons are constructed in accordance with my invention I employ thereon an auxiliary means and refer to Figures 6 and 7 which are fragmentary illustrations of the body 10 and the lug 17 that the slit 19 as cut through the body 10 is here illustrated as cut through the lug 17, in which event the body 10 at this juncture would be entirely separated through its entire length weakening the structure too greatly for safe and practical usage. This incapacity is thoroughly overcome by employing a carbon steel tubular sleeve or bushing 20, Figures 8 and 9. A series of slits 21 are cut through the bushing 20, for a limited distance only of its length, a pair of slits are cut through lengthwise of the bushing leaving a margin of metal at each end thereof which holds the bushing together as a unit. The product thus made provides an expansible and contractable sleeve or bushing which when positioned within the hole 18, of the lug 17 is adapted to function in the same capacity for the aluminum piston as the cast iron piston functions when the slit 19 is cut into but not through the lug 17. In order to retain the sleeve 20 within the hole 18 of the lug 17 a bolt 22 Figure 10 is employed, the head of which is practically equal to the diameter of the lug 17, and the nut is of like size, and the bolt whose body is slightly less in diameter than the hole in the sleeve 20, is assembled in the position as illustrated at Figure 7, the sleeve is thereby held in position. It is obvious that the sleeve 20 is of a length slightly less than the length of the lug 17 and the bolt with its nut when tightened does not clamp the surface of the lug 17 between the head and the nut of the bolt 22, there being just sufficient space between the head and nut to allow the body 10 free action to expand and contract as conditions may require.

It is clear from the foregoing description that this construction of piston is thoroughly practical in its make up, as the alignment of the piston pin holes in the bosses 13, is in no way disaligned or affected in any way by this arrangement. The piston pin 23 here shown in position is held sufficiently stable although only one boss is integral with the body 10, does not in any way affect the strength of this construction when it is recognized that the boss which is independent of and separated from the body 10, has an adequate connection with the head 11 equal to what it would have were it united to the body especially when the piston packing ring is positioned as illustrated in Figure 1.

It is obvious therefore that this invention fulfills the purpose for which it is intended, and it is conceded that minor changes may be made in the size, form and shape of this structure without departing from the spirit of this invention as set forth in the appended claims.

I claim as my invention:

1. A piston which has a support for a piston pin, said support having integral connection with one side of the piston body only, and a head member connected to said support.

2. A piston having a support for the head and body, said support connected to one side of the body only, and a piston pin adapted to be positioned within said support.

3. A piston having portions forming a support for a piston pin for said piston, a part of said portions having integral connection with the body of said piston at one side only, and the other portion of said support having connection independent of and free from the body of said piston and connecting with the head of said piston.

4. A piston having its head and body connected by a piston pin support, a portion of said support having integral connection with one side of the body only, and the other portion integrally connected to said head and supporting a piston pin boss adapted to receive a piston pin, which connects said piston for operative engagement.

5. A piston having a head portion and a body portion separated from each other by an opening therebetween, a support for said head and body having integral connection with one side of the body only, and a piston pin adapted to be positioned within said support.

6. A piston having a head portion and a body portion separated by a space or opening therebetween, a piston packing ring positioned within said space, said head and body integrally connected with each other by means of an internal support, said support having integral connection with one side only of the body portion of said piston and a piston pin adapted to be carried by said support.

7. A piston comprising a head and body, internal ribs supporting piston pin receiving bosses, one of said bosses being isolated from the body of said piston and the other boss integrally connected to said piston body and the head member connected to said ribs supporting said bosses.

8. A piston comprising a head and body, an internal rib supporting piston pin receiving members, one of said members supported by said rib being isolated from said piston body, the other member integrally connected with said rib and body, and the piston head integrally connected with said rib.

9. A piston comprising a head and body, said head separated from said body by an opening formed to receive a piston packing ring, a slit cut through said body and lengthwise thereof, providing a yielding, expansible and contractable piston body for more than one-half of its circumferential area, an internal rib supporting piston pin receiving members, one of said members supported by said rib being isolated from said piston body, and the other member integrally connected with said rib and body, and the piston head integrally connected with said rib.

10. A piston having its head and body separated by means of a piston packing ring receiving groove, a packing ring positioned within said groove, said head and body of said piston integrally connected on one side only by means of a piston pin receiving member and a rib, said piston head having an internal rib projecting therefrom, supporting a piston pin receiving boss, said boss being isolated from said piston body, said piston body having a slit cut through and lengthwise its vertical axis, which provides said body with a yielding, expansible and contractable area for more than one-half of its circumference.

11. A piston having its head and body separated from each other by means of a piston packing ring receiving groove, and a piston packing ring seated in said groove, the body of said piston provided with means rendering said body yieldingly expansible and contractable for more than one-half of its circumference, the head and body members comprising said piston connected integrally with each other on one side only by means of a piston pin receiving member and a rib, said head having a rib projecting therefrom supporting a piston pin receiving boss, said rib and said boss being isolated from said piston body.

12. A piston having a head and body, the body of said piston having means rendering it yieldingly expansible and contractable for more than one-half of its circumferential area, said head member and said body member integrally connected with each other on one side only, and a piston packing ring seated within the groove formed to separate the head member from said body member of said piston.

13. A piston having its head and body joined together on one side only by means of a piston pin support and a projection on said piston head supporting a boss, which boss being spaced away from and isolated from the body of said piston.

14. A piston having a head and body, piston pin supporting means connecting said head and body on one side only, the body of said piston having a yielding expansible and contractable area for more than one-half of its external circumference.

15. A piston having a head portion spaced away from its body portion by a space or gap between the head and body, the head and body comprising said piston being internally connected to each other by a rib or support having integral intersection with the body portion of said piston at one side only, and means within said body adapted to support a piston pin.

16. A piston having a head portion spaced away from its body portion by a space or gap between the head and body, a piston packing ring positioned within said space between the head and body, the body portion of said piston provided with a slit cut through said body, rendering said body yieldingly expansible and contractable, the head and body comprising said piston being internally connected to each other by a rib or support having intersection with the body portion of said piston at one side only, and means within said body adapted to support a piston pin for operative connection for said piston.

17. A piston having a head portion spaced away from its body portion by a piston packing ring receiving groove and a piston packing ring positioned within said groove, the body portion of said piston having a slit cut through said body rendering said body yieldingly expansible and contractable for more than one-half of its circumferential area, an internal yoke within said body adapted to span the slit cut through said body and having integral intersection with said body on opposite sides of said slit and adapted to yield in conformity with the body of said piston, the head and body comprising said piston being integrally connected to each other by a rib or support constructed for intersection with the body portion of said piston at one side only, and a piston pin supporting means within the body portion of said piston.

18. A piston having a head portion spaced away from its body portion by a piston packing ring receiving groove and a piston packing ring positioned within said groove, the body portion of said piston having a slit cut through said body, rendering said body yieldingly expansible and contractable for more than one-half of its circumferential area, an internal yoke within said body adapted to span the slit cut through said body and having integral intersection with said body on opposite sides of said slit, a resilient spring bushing positioned within said yoke, said yoke and said bushing adapted to yield in conformity with the body of said piston, the head and body comprising said piston being integrally connected to each other by a rib or support constructed for intersection with the body portion of said piston at one side only, and a piston pin supporting means within the body portion of said piston.

In confirmation hereof I hereto attach my signature.

STEPHEN D. HARTOG.